(12) United States Patent
Retief

(10) Patent No.: US 7,780,321 B1
(45) Date of Patent: Aug. 24, 2010

(54) LIGHT ASSEMBLY FOR BICYCLE

(75) Inventor: Darren Retief, Vista, CA (US)

(73) Assignee: Ravx Inc., Vista, CA (US)

( * ) Notice: Subject to any disclaimer, the term of this patent is extended or adjusted under 35 U.S.C. 154(b) by 31 days.

(21) Appl. No.: 12/378,986

(22) Filed: Feb. 20, 2009

(51) Int. Cl.
*F21V 33/00* (2006.01)
*B62J 6/00* (2006.01)

(52) U.S. Cl. .................. 362/474; 362/475; 362/476; 362/640

(58) Field of Classification Search ............... 362/473, 362/474, 475, 476, 431, 640, 655, 656, 657, 362/658, 659
See application file for complete search history.

(56) References Cited

U.S. PATENT DOCUMENTS

| | | | |
|---|---|---|---|
| 4,479,693 A * | 10/1984 | Uyeda et al. | 439/527 |
| 4,796,972 A | 1/1989 | Thomas et al. | 350/99 |
| 6,736,529 B1 | 5/2004 | Lee | 362/287 |
| 7,070,295 B1 | 7/2006 | Lee | 362/191 |
| 7,220,028 B2 * | 5/2007 | Nakayama et al. | 362/474 |
| 7,293,900 B1 | 11/2007 | Lee | 362/476 |
| 2006/0002119 A1 * | 1/2006 | Sharp | 362/473 |
| 2007/0109803 A1 * | 5/2007 | Chuang | 362/473 |

* cited by examiner

*Primary Examiner*—Jacob Y Choi
(74) *Attorney, Agent, or Firm*—Charles E. Baxley

(57) ABSTRACT

A light assembly includes an attaching member having a chamber for attaching onto an object and having two couplers, two electric cables engaged in the attaching member and each having two end terminals disposed in the couplers, a light device and a power supply device each include a latch device for engaging with the couplers and for attaching to the couplers of the attaching member, and each having two connectors for electrically connecting to the terminals of the electric cables and for electrically connecting the light device to the power supply device, and for allowing the light device and the power supply device to be easily and quickly attach to and disengaged from the attaching member without external wires.

12 Claims, 6 Drawing Sheets

LIGHT ASSEMBLY FOR BICYCLE

BACKGROUND OF THE INVENTION

1. Field of the Invention

The present invention relates to a light assembly for attaching to a bicycle, and more particularly to a light assembly including a simplified structure for easily and quickly attaching and securing onto a bicycle and for allowing the light assembly to be easily and quickly disengaged from the bicycle without external wires that connecting the light device and the power supply device.

2. Description of the Prior Art

Typical light assemblies or illumination devices for bicycles comprise a light device attached to the handlebar of the bicycles, and a rotary electrical contact assembly providing an electric power from a bicycle generator to the light device for generating a constant illumination.

For example, U.S. Pat. No. 4,796,972 to Thomas et al. discloses one of the typical illuminated spoke mounted reflectors for bicycles and also comprising a complicated bicycle generator attached to a fork member of the bicycles and coupled to a light device with electric wires or cables.

However, it takes time to attach or to mount the complicated bicycle generator and the light device onto the bicycles. In addition, the typical illuminated spoke mounted reflectors for bicycles comprise a complicated structure that may not be easily manufactured and that may include a greatly increased manufacturing cost. Furthermore, the electric wires or cables are exposed and may be easily cut by various objects, and may be dangerous to the riders.

U.S. Pat. No. 6,736,529 to Lee, U.S. Pat. No. 7,070,295 to Lee, and U.S. Pat. No. 7,293,900 to Lee disclose three further typical light devices each having a complicated configuration having many parts and elements for attaching and securing onto various objects or bicycles with fastening straps.

However, an outer housing comprise a complicated structure for attaching and securing various parts and elements therein, such as the light members, the reflectors, the battery storing casings, etc., such that the typical light devices also may not be easily manufactured and such that the typical light devices also may include a greatly increased manufacturing cost. In addition, the light members and the battery storing casings may not be disengaged from the outer receptacle and may not be changed to the other new ones.

The present invention has arisen to mitigate and/or obviate the afore-described disadvantages of the conventional light assemblies for bicycles.

SUMMARY OF THE INVENTION

The primary objective of the present invention is to provide a light assembly including a simplified structure for easily and quickly attaching and securing onto a bicycle and for allowing the light assembly to be easily and quickly disengaged from the bicycle without external wires that connecting the light device and the power supply device.

In accordance with one aspect of the invention, there is provided a light assembly comprising an attaching member including a chamber formed therein for receiving an object and for attaching and securing onto the object, and including a first coupler and a second coupler provided on the attaching member and including two channels formed therein, two electric cables engaged in the channels of the attaching member and each include two end terminals disposed in the first and the second couplers respectively, a light device including a light member disposed in a housing, and including a latch device for engaging with the first coupler and for attaching and securing the latch device of the light device to the first coupler of the attaching member, and including two connectors electrically coupled to the light member for electrically connecting to the terminals of the electric cables when the latch device of the light device is engaged with the first coupler, and a power supply device including a container having a chamber formed therein, a battery received in the container, and including a latch device for engaging with the second coupler and for attaching and securing the latch device of the power supply device to the second coupler of the attaching member, and including two connectors electrically coupled to the battery for electrically connecting to the terminals of the electric cables when the latch device of the power supply device is engaged with the second coupler of the attaching member, and thus for allowing the light device and the power supply device to be easily and quickly attached onto and disengaged from the object or the handlebar of the bicycle.

The channels of the attaching member are communicating with the chamber of the attaching member for receiving and shielding the electric cables. The first and the second couplers each include two orifices formed therein and communicating with the channels of the attaching member for receiving or engaging with the terminals of the electric cables respectively.

The power supply device includes a switch for being actuated to control a power supply from the power supply device to the electric cables and to the light device. The power supply device includes a connecting member electrically coupled to the battery for connecting to an electric power source and for supplying an electric energy to charge the battery.

The first and the second couplers each include a base plate, and two arms extended from the base plate and extended away from the attaching member and spaced from each other for forming a substantially C-shaped space between the arms and for detachably receiving the latch devices of the light device and the power supply device respectively.

The first and the second couplers each include an inwardly folded flange extended from each arm for partially closing the space and for forming a C-shaped retaining space in each of the first and the second couplers, and the latch devices of the light device and the power supply device each include two opposite ribs for engaging with the spaces of the first and the second couplers, and two opposite grooves for receiving the flanges and for attaching and securing the latch devices to the first and the second couplers respectively.

The first and the second couplers each include a stop formed in one end portion thereof for engaging with the flange and for limiting the latch devices to slide relative to the first and the second couplers respectively and for preventing the latch devices from being disengaged from the first and the second couplers inadvertently.

The first and the second couplers each include a catch extended from the base plate, and the latch devices of the light device and the power supply device each include a lock cavity formed therein for receiving or engaging with the catch and for detachably latching and securing the latch devices to the first and the second couplers respectively.

The first and the second couplers each include a knob extended outwardly therefrom and located closer to the catch for disengaging the catch from the lock cavity of the latch device for allowing the latch device to be disengaged from the first and the second couplers respectively.

The attaching member includes two end members, and a fastener for selectively securing the end members of the attaching member together and for selectively disengaging from the end members of the attaching member.

The end members of the attaching member each include a bifurcated structure having a slot formed between two limbs, and the attaching member includes an aperture laterally formed in one of the end members and formed through the limbs and communicating with the slot of the end member for receiving a pole, and the pole includes a screw hole formed therein for engaging with the fastener, and the fastener is slidably engaged through the slot of the other end member.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
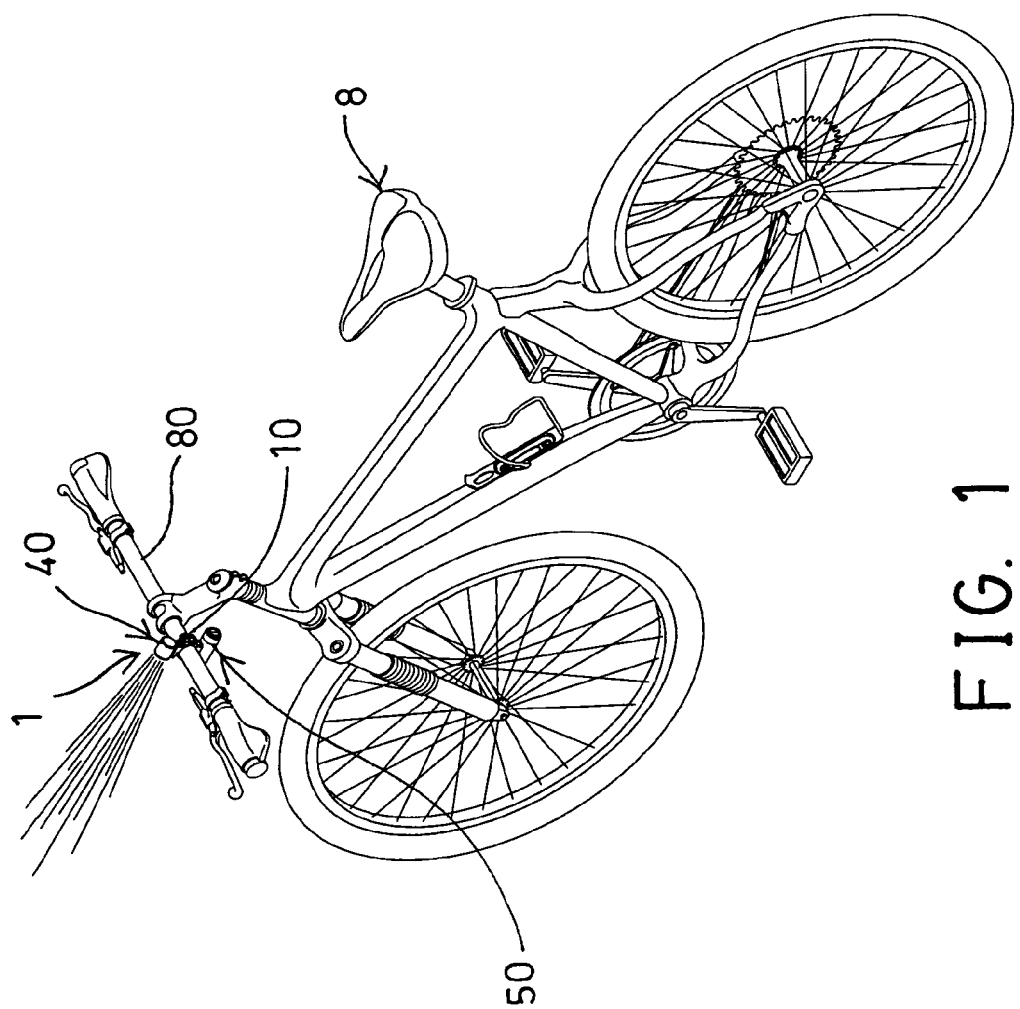
FIG. 1 is a perspective view illustrating an attachment of a light assembly onto a bicycle in accordance with the present invention.
Figure 2:
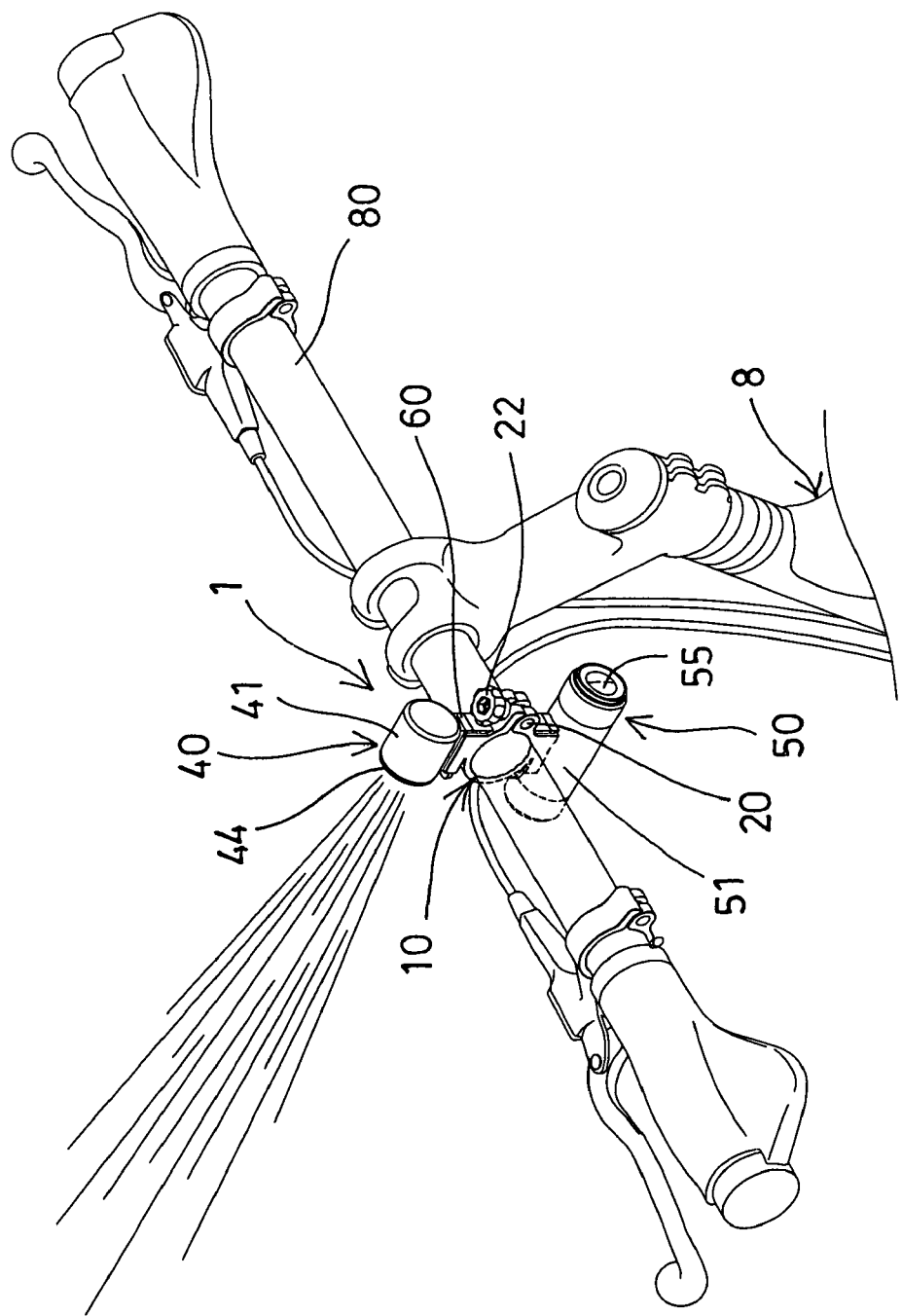
FIG. 2 is an enlarged partial perspective view illustrating the operation of the light assembly and the bicycle.

Referring to the drawings, and initially to FIG. a light assembly 1 in accordance with the present invention is provided for easily and quickly attaching and securing onto various objects 8, such as the handlebar 80 of the bicycles 8, and arranged for allowing the light assembly 1 to be easily and quickly disengaged from the handlebar 80 of the bicycles 8 when required. As shown in FIGS. 3-6, the light assembly 1 comprises an attaching member 10 including a substantially C-shaped structure having a chamber 11 formed therein for receiving the object or the handlebar 80 of the bicycle 8, and for easily and quickly attaching and securing onto the handlebar 80 of the bicycle 8.

Figure 4:
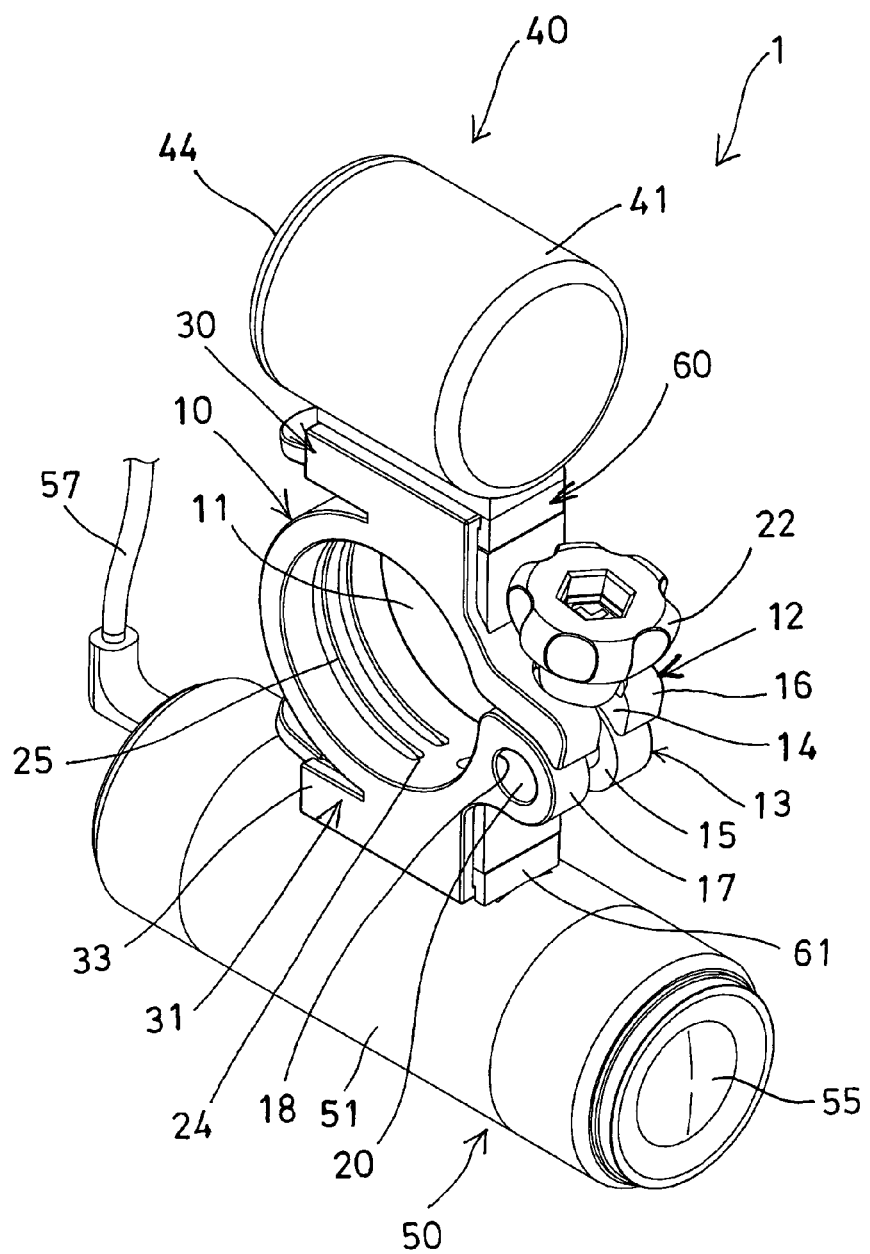
FIG. 4 is a rear perspective view of the light assembly.
Figure 6:
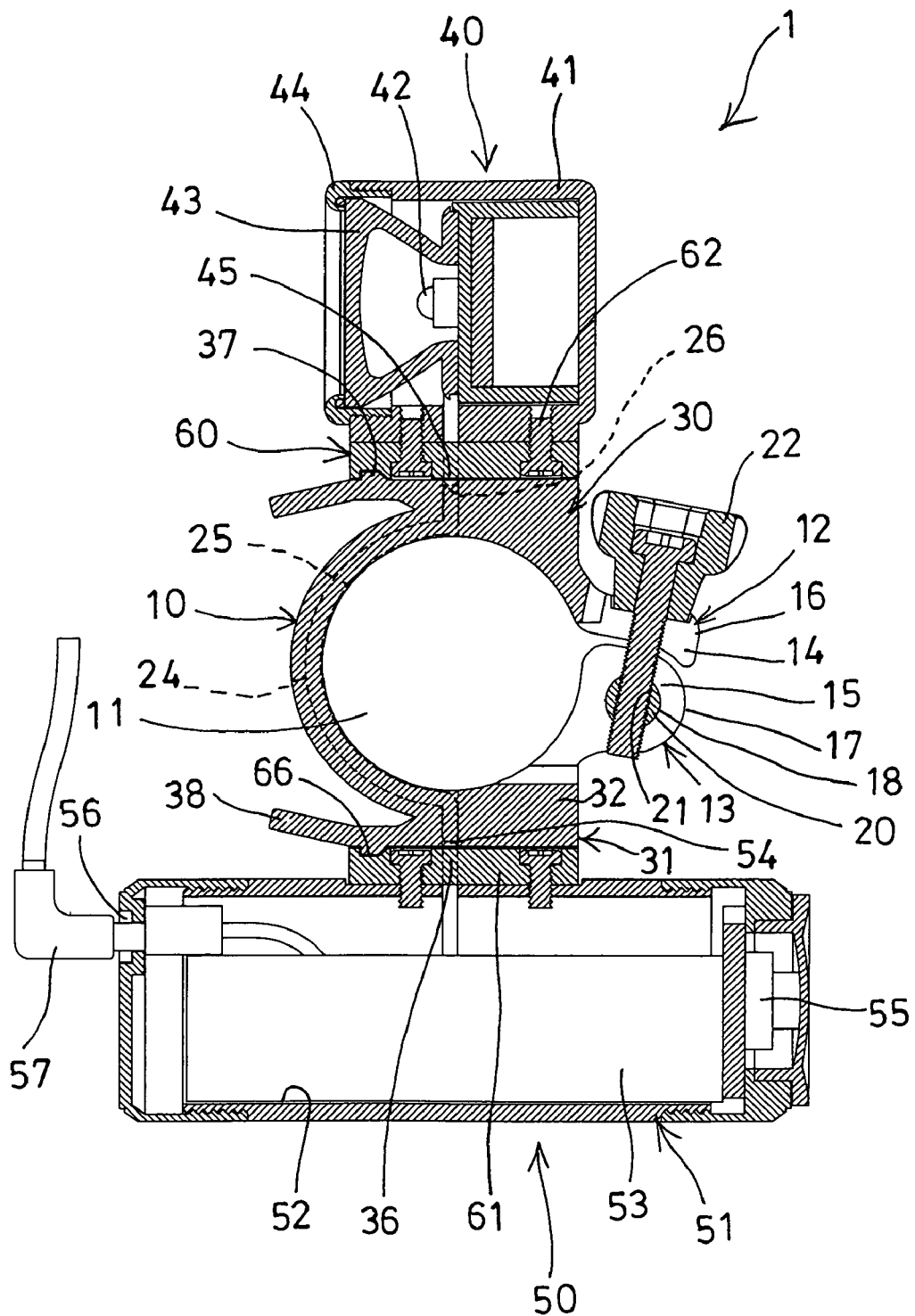
FIG. 6 is a cross sectional view of the light assembly taken along lines 6-6 of FIG. 3.

The C-shaped attaching member 10 includes two end portions or end members 12, 13 located close to each other and positioned one above the other, the two end members 12, 13 each include a bifurcated structure having a slot 14, 15 formed between two limbs 16, 17, in which the slots 14, 15 at the two end members 12, 13 of the attaching member 10 are aligned with each other, best shown in FIG. 4. The attaching member 10 further includes an aperture 18 laterally formed in one end member 13 thereof and formed through both of the limbs 17 and intersecting or communicating with the slot 15 of the end member 13 of the attaching member 10 for receiving a pole 20 therein which includes a screw hole or an inner thread 21 formed therein (FIG. 6).

A bolt or fastener 22 is slidably engaged through the slot 14 of one end member 12, and threaded or engaged with the screw hole or inner thread 21 of the pole 20 for allowing the fastener 22 to selectively and solidly secure the two end members 12, 13 together and thus to solidly secure the attaching member 10 onto the object or the handlebar 80 of the bicycle 8. When the fastener 22 is unthreaded relative to the attaching member 10, the fastener 22 and the pole 20 may be rotated relative to the attaching member 10, and the fastener 22 may be disengaged from the slot 14 of the end member 12 for allowing the two end members 12, 13 to be separated from each other and for allowing the attaching member 10 to be easily and quickly attached onto and disengaged from the object or the handlebar 80 of the bicycle 8.

Figure 3:
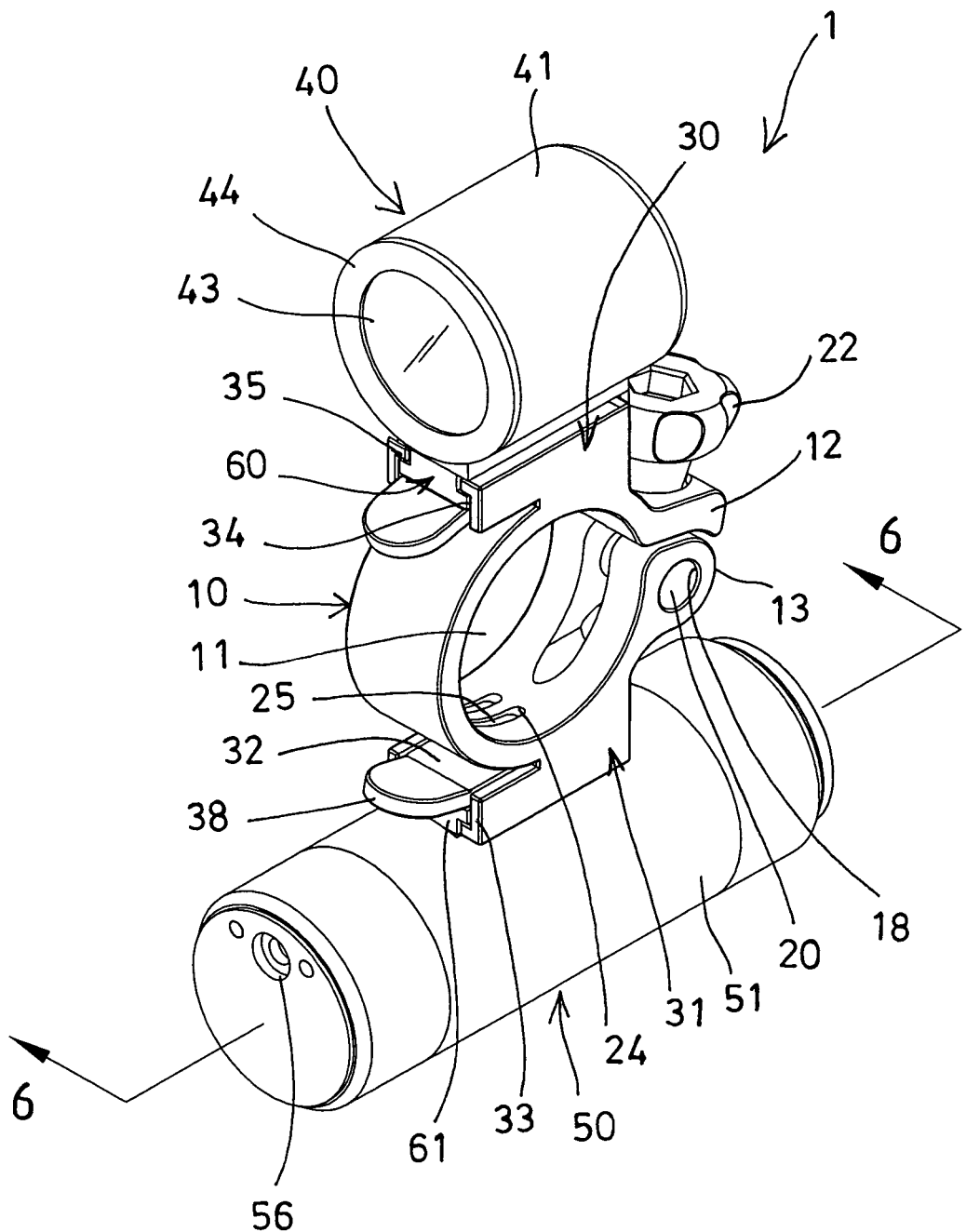
FIG. 3 is a front perspective view of the light assembly.
Figure 5:
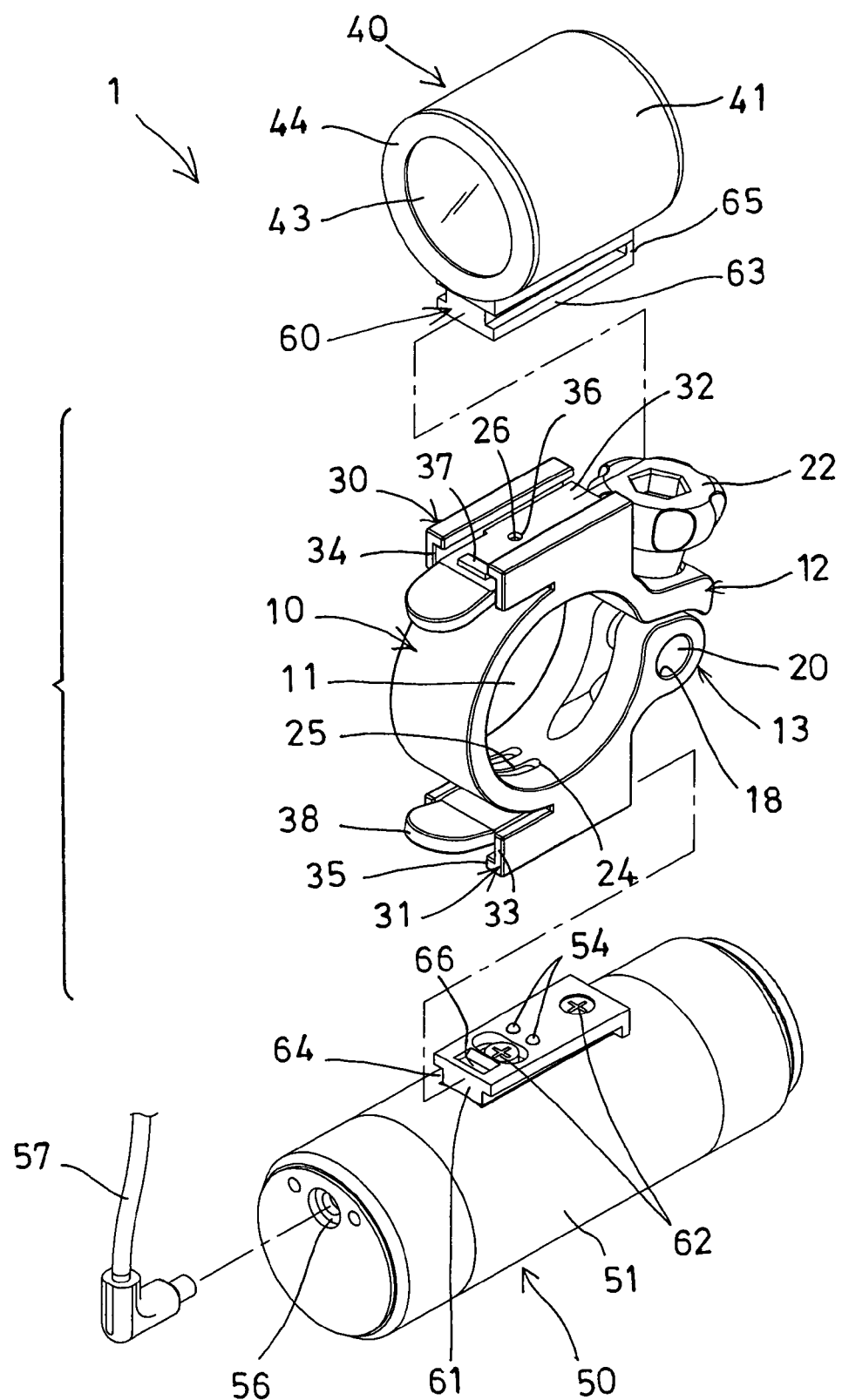
FIG. 5 is a partial exploded view of the light assembly.

The attaching member 10 further includes two substantially C-shaped attachments or couplers 30, 31 oppositely formed or provided thereon, or formed on the upper portion and the lower portion thereof respectively for quickly and detachably attaching or securing a light device 40 and a power supply device 50 to the attaching member 10. For example, the couplers 30, 31 each include a base plate 32, and two limbs or arms 33 extended from the base plate 32 and extended away from the attaching member 10 and spaced from each other for forming a space 34 between the arms 33, and an inwardly folded hook or flange 35 extended from each arm 33 for partially closing the space 34 and for forming a C-shaped locking or retaining space 34 in each of the couplers 30, 31 (FIGS. 3, 5).

The attaching member 10 further includes two channels 24 formed therein and communicating with the chamber 11 of the attaching member 10, and two electric wires or cables 25 received and shielded and engaged into the channels 24 of the attaching member 10 respectively. The couplers 30, 31 each include two orifices 36 formed therein (FIGS. 5, 6) and communicating with the channels 24 of the attaching member 10 respectively, and the electric cables 25 each include two end connectors or terminals 26 disposed or engaged in the orifices 36 of the couplers 30, 31 respectively. The couplers 30, 31 each further include a projection or catch 37 extended from the base plate 32 and located closer to an outer end or free end portion of the couplers 30, 31, and a hand grip or knob 38 extended outwardly therefrom and located closer to the outer end or free end portion of the couplers 30, 31 or the catch 37.

The light device 40 and the power supply device 50 each include a latch device 60 formed or provided thereon, for example, the latch devices 60 each include a T-shaped dovetail or latch member 61 attached or secured to the light device 40 and the power supply device 50 with screws or fasteners 62 respectively, for engaging with the couplers 30, 31 respectively and for quickly and detachably attaching or securing the light device 40 and the power supply device 50 to the attaching member 10. The latch members 61 each include two opposite ribs 63 for engaging with the spaces 34 of the couplers 30, 31, and two opposite grooves 64 for receiving or for engaging with the flanges 35 respectively and for quickly and detachably attaching or securing the latch members 61 to the couplers 30, 31 respectively.

It is preferable that the latch members 61 or the latch devices 60 each include a stop 65 formed in one end portion thereof and extended into one end portion of the groove 64 for engaging with the flanges 35 and for limiting the latch members 61 or the latch devices 60 to slide relative to the couplers 30, 31 respectively, and for preventing the latch members 61 or the latch devices 60 from being disengaged from the couplers 30, 31 inadvertently. The latch members 61 each further include a lock cavity 66 formed therein for selectively engaging with the catch 37 and for detachably latching and locking or anchoring or securing the latch members 61 or the latch devices 60 to the couplers 30, 31 respectively. The knob 38 may be depressed or actuated to disengage the catch 37 from the lock cavity 66 of the latch member 61 for allowing the latch members 61 or the latch devices 60 to be easily and quickly attached and secured to and disengaged from the couplers 30, 31 respectively.

The light device 40 includes an outer housing 41, a light bulb or light emitting diode or light member 42 disposed or engaged in the housing 41, a hood or lens 43 also disposed or engaged in the housing 41 and engaged onto the light member 42, and secured or retained to the housing 41 with a cap 44, and includes two terminals or connectors 45 (FIG. 6) electrically coupled to the light member 42, and partially extended out of the latch member 61 for engaging into the orifices 36 of the coupler 30 respectively and for electrically coupling or connecting to the electric cables 25 with the terminals 26 when the latch member 61 or the latch device 60 of the light device 40 is engaged with the coupler 30.

The power supply device 50 includes a container 51 having a chamber 52 formed therein for receiving one or more batteries 53 therein, and includes two terminals or connectors 54 (FIG. 5) electrically coupled to the batteries 53, and partially extended out of the latch member 61 for engaging into the orifices 36 of the coupler 31 respectively and for electrically coupling or connecting to the electric cables 25 with the terminals 26 when the latch member 61 or the latch device 60 of the power supply device 50 is engaged with the coupler 31, and includes a button or switch 55 for being depressed or actuated by the user to control the power supply from the power supply device 50 to the electric cables 25 and to the light device 40.

The power supply device 50 may further include a socket or plug or connecting member 56 electrically coupled to the batteries 53 and for coupling or connecting to the other electric power supplies or sources, such as the cigarette lighter sockets for the vehicles or the like and for supplying the electric energy to selectively charge the batteries 53 when required. It is to be noted that various kinds of light devices 40 and various kinds of power supply devices 50 may be easily and quickly and changeably attached or secured to the attaching member 10 with the latch devices 60 and the couplers 30, 31, and the electric cables 25 may be suitably received and shielded within the attaching member 10 without being exposed.

Accordingly, the light assembly in accordance with the present invention includes a simplified structure for easily and quickly attaching and securing onto a bicycle and for allowing the light assembly to be easily and quickly disengaged from the bicycle without external wires that connecting the light device and the power supply device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A light assembly comprising:
an attaching member including a chamber formed therein for receiving an object and for attaching and securing onto the object, and including a first coupler and a second coupler provided on said attaching member, said attaching member including two channels formed therein,
two electric cables engaged and shielded in said channels of said attaching member and each include two end terminals disposed in said first and said second couplers respectively,
a light device including a light member disposed in a housing, and including a latch device for engaging with said first coupler and for attaching and securing said latch device of said light device to said first coupler of said attaching member, and including two connectors electrically coupled to said light member for electrically connecting to said terminals of said electric cables when said latch device of said light device is engaged with said first coupler, and
a power supply device including a container having a chamber formed therein, a battery received in said container, and including a latch device for engaging with said second coupler and for attaching and securing said latch device of said power supply device to said second coupler of said attaching member, and including two connectors electrically coupled to said battery for electrically connecting to said terminals of said electric cables when said latch device of said power supply device is engaged with said second coupler of said attaching member.

2. The light assembly as claimed in claim 1, wherein said channels of said attaching member are communicating with said chamber of said attaching member for receiving and shielding said electric cables.

3. The light assembly as claimed in claim 1, wherein said first and said second couplers each include two orifices formed therein and communicating with said channels of said attaching member for engaging with said terminals of said electric cables respectively.

4. The light assembly as claimed in claim 1, wherein said power supply device includes a switch for being actuated to control a power supply from said power supply device to said electric cables and to said light device.

5. The light assembly as claimed in claim 1, wherein said power supply device includes a connecting member electrically coupled to said battery for connecting to an electric power source and for supplying an electric energy to charge said battery.

6. The light assembly as claimed in claim 1, wherein said first and said second couplers each include a base plate, and two arms extended from said base plate and extended away from said attaching member and spaced from each other for forming a space between said arms and for detachably receiving said latch devices of said light device and said power supply device respectively.

7. The light assembly as claimed in claim 6, wherein said first and said second couplers each include an inwardly folded flange extended from each arm for partially closing said space and for forming a C-shaped retaining space in each of said first and said second couplers, and said latch devices of said light device and said power supply device each include two opposite ribs for engaging with said spaces of said first and said second couplers, and two opposite grooves for receiving said flanges and for attaching and securing said latch devices to said first and said second couplers respectively.

8. The light assembly as claimed in claim 7, wherein said first and said second couplers each include a stop formed in one end portion thereof for engaging with said flange and for limiting said latch devices to slide relative to said first and said second couplers respectively.

9. The light assembly as claimed in claim 1, wherein said first and said second couplers each include a catch extended from said base plate, and said latch devices of said light device and said power supply device each include a lock cavity formed therein for engaging with said catch and for detachably latching and securing said latch devices to said first and said second couplers respectively.

10. The light assembly as claimed in claim 9, wherein said first and said second couplers each include a knob extended outwardly therefrom and located closer to said catch for disengaging said catch from said lock cavity of said latch device for allowing said latch device to be disengaged from said first and said second couplers respectively.

11. The light assembly as claimed in claim 1, wherein said attaching member includes two end members, and a fastener for selectively securing said end members of said attaching member together and for selectively disengaging from said end members of said attaching member.

12. The light assembly as claimed in claim 11, wherein said end members of said attaching member each include a bifurcated structure having a slot formed between two limbs, and said attaching member includes an aperture laterally formed in one of said end members and formed through said limbs and communicating with said slot of said end member for receiving a pole, and said pole includes a screw hole formed therein for engaging with said fastener, and said fastener is slidably engaged through said slot of the other end member.

* * * * *